United States Patent [19]

Takabayashi

[11] Patent Number: 5,156,928
[45] Date of Patent: Oct. 20, 1992

[54] PROTECTIVE APPARATUS AND METHOD FOR A FUEL CELL

[75] Inventor: Yasuhiro Takabayashi, Kawasaki, Japan

[73] Assignee: Fuji Electric Co., Ltd., Kanagawa, Japan

[21] Appl. No.: 593,661

[22] Filed: Oct. 5, 1990

[30] Foreign Application Priority Data

Oct. 27, 1989 [JP] Japan .................. 1-278574

[51] Int. Cl.$^5$ .................................. H01M 8/04
[52] U.S. Cl. ........................... 429/23; 429/22; 429/61
[58] Field of Search ................ 429/23, 61, 22

[56] References Cited

U.S. PATENT DOCUMENTS

| | | | |
|---|---|---|---|
| 3,745,047 | 7/1973 | Fancuillo et al. | 429/23 |
| 3,850,695 | 11/1974 | Keller et al. | 429/23 |
| 4,424,491 | 1/1984 | Bobbett et al. | 429/23 |
| 4,677,037 | 6/1987 | Takabayaski | 429/23 |

Primary Examiner—Mark L. Bell
Assistant Examiner—Deborah Jones
Attorney, Agent, or Firm—Spencer, Frank & Schneider

[57] ABSTRACT

A protective apparatus and method for a fuel cell comprising a switching device connected to the output of the fuel cell, a device for detecting the output voltage of the fuel cell, a device for setting a reference voltage, a comparator for comparing the detected output voltage of the fuel cell with the reference voltage, and a device for opening the switching device when the detected output voltage of the fuel cell drops below the reference voltage.

16 Claims, 9 Drawing Sheets

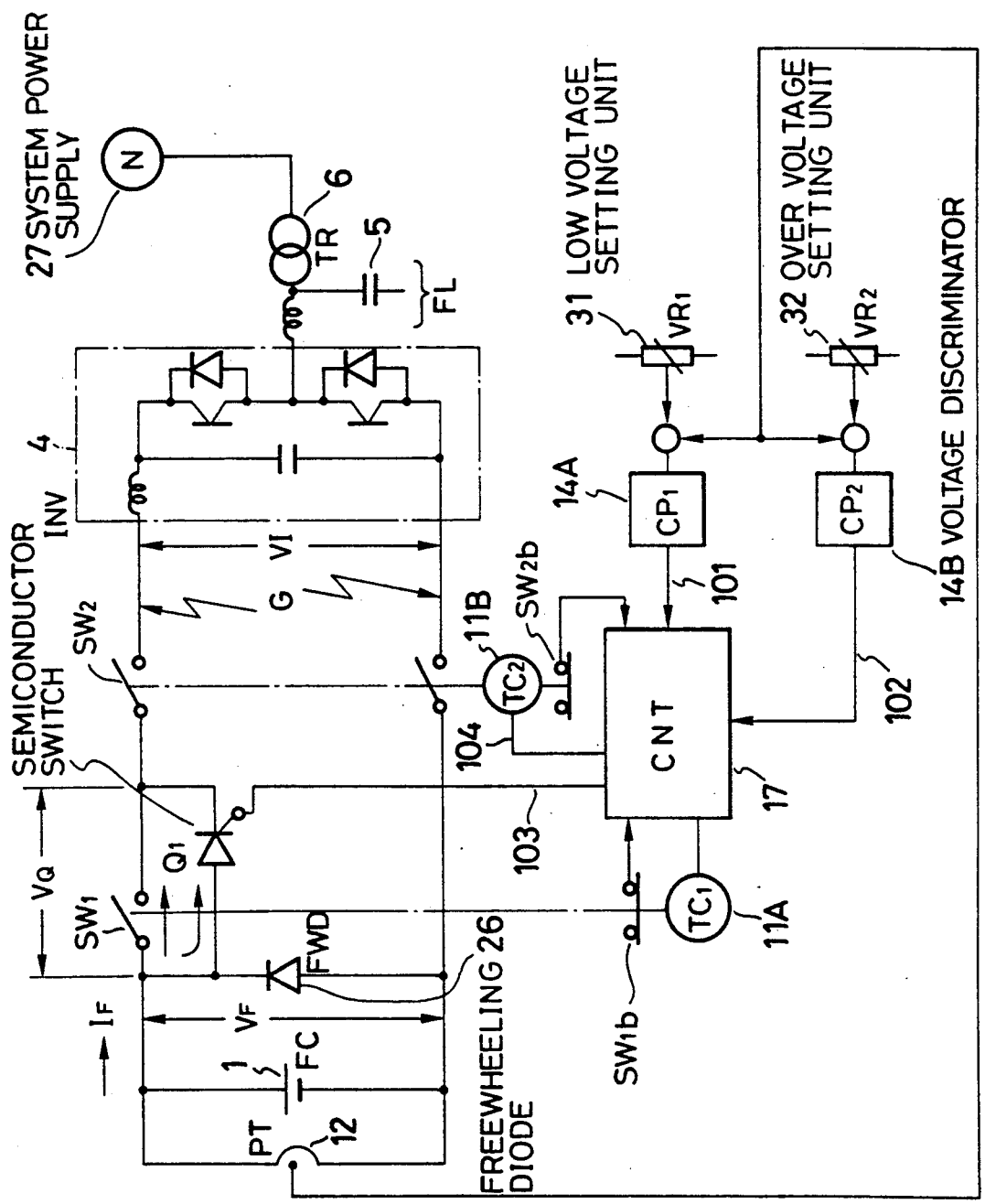
F I G. 5

PROTECTIVE APPARATUS AND METHOD FOR A FUEL CELL

BACKGROUND OF THE INVENTION

1. Field of the Invention

The present invention relates to a protective apparatus and method for protecting a fuel cell from overload or short-circuit failures that may occur in a large capacity fuel cell power supply. Here, the large capacity fuel cell power supply refers to a power system that has a capacity of more than 1 MW, such as a 5 MW or 10 MW fuel cell power supply.

2. Description of the Prior Art

A fuel cell power supply, being different from the other power sources, maintains its output current nearly constant even if an overload or short-circuit failure occurs in the output circuit. This presents a problem that overcurrent protective apparatuses for the other power sources cannot be applied to the fuel cell power supply.

FIG. 1 is a schematic block diagram showing a conventional fuel cell power supply. A current detector (CT) 16, e.g. a current transformer, detects the output current $I_F$ supplied from a fuel cell (FC) 1 to a load ($R_L$) 7. A controller (CNT) 17 controls a raw-fuel control valve 18 in accordance with the detected current. The raw-fuel control valve 18 supplies required raw-fuel (Q) to a reformer (RF) 20.

In the reformer 20, hydrogen $U_J$, which is generated by the reforming reaction between methanol and water in the form of mixture, is fed to the fuel cell (FC) 1. The fuel cell 1 converts chemical energy generated by the electrochemical reaction between hydrogen and oxygen into electrical energy having the quantity of electricity of $U_E$. A part of the unreacted hydrogen in the fuel cell 1 is produced as off gas $U_B$. The off gas $U_B$ is fed back to the burner of the reformer 20 to be burned to maintain the temperature of the reforming catalyst filled in the reformer 20.

In FIG. 2, a curve A shows the I-V characteristics of the fuel cell 1. Reference character $U_J$ designates the quantity of electricity corresponding to the total quantity of the hydrogen produced by the reforming reaction in the reformer 20. The quantity $U_J$ corresponds to a current $I_{FS}$, while the normal rated current $I_{FN}$ corresponds to the quantity of electricity $U_E$.

Increasing the load 7 changes the output current and voltage of the fuel cell 1 in accordance with the I-V characteristics of the fuel cell 1. The voltage $V_{FO}$ is the no-load voltage. The voltage $V_{FP}$ corresponds to the minimum current flowing into the load 7 from the fuel cell 1, and the line passing this point and the origin defines the minimum load line B. The voltage $V_{FN}$ is the voltage of the fuel cell 1 in the normal operation, and the line passing this point ($I_{FN}$, $V_{FN}$) and the origin defines the rated load line C.

If the voltage of the fuel cell 1 decreases lower than $V_{FN}$ owing to a short-circuit failure or an overload due to the increase of the load 7, that is, if the output current of the fuel cell 1 exceeds $I_{FN}$, the voltage will rapidly reduce to $V_{FS}$ instead of tracing the broken line D which is the extended line of the I-V characteristic line. The line passing the point of ($I_{FS}$, $V_{FS}$) and the origin is called short-circuit line E. The intersection S of the lines D and E corresponds to the current $I_S$ which will be described later.

Generally, the ratio $U_E/U_J$ is called fuel availability. The availability can be calculated by performing a division between the two after converting the hydrogen quantity $U_J$ into the current $I_{FS}$ or after converting the current $I_{FS}$ detected by the current detector 16 into the hydrogen quantity $U_J$.

The fuel cell power supply is usually operated at the availability of about 0.75-0.8. If a short-circuit failure occurs in such an operating state, the hydrogen to be fed to the reformer 20 as the off gas is completely consumed by the electrochemical reaction in the fuel cell 1. This makes $U_J=U_E$, and so $I_{FS}=I_{FN}/(0.75-0.8)=(1.33-1.25)\times I_{FN}$, thus resulting in a small increase in the overcurrent. In addition, the short-circuit or overload in the fuel cell power supply poses a problem that it causes a gas shortage, which will degrade the fuel cell 1.

In power supplies other than a fuel cell, the short-circuit or overload will cause a current $I_S$ of several times the rated current. This can be easily detected by an ordinary overcurrent protective apparatus, and so the impaired circuit can be readily disconnected in response to the detection result.

A fuel cell power supply, however, cannot take quick action to protect the fuel cell 1, because the excess part of the overcurrent is very small: the overcurrent of only 1.33-1.25 times an rated current occurs, which cannot be detected by the ordinary protective apparatus, or which requires considerable time delay to enter into a protective operation.

The inventor and others are planning to construct a large capacity fuel cell power supply of 5-10 MW. This is expected to present the following problems of:

(1) Detecting overload and short-circuit failure in a single or system interconnection operation of the fuel cell power supply, and detecting the regenerative power when inverter failure occurs in the system operation.

(2) The capacity of the switch for opening the output circuit of the fuel cell 1 in a stable and reliable manner in response to the detection signal.

The problem (2) is important with regard to the second design and construction of the switch. This will be described in more detail. The output voltage from the fuel cell 1, as is known, is a direct voltage. Rough output values of the fuel cell 1 are shown in Table 1.

TABLE 1

| CAPACITY | 5 MW | 10 MW |
| --- | --- | --- |
| RANGE OF DC VOLTAGE | APPROXIMATELY 1500-2200 V | APPROXIMATELY 1500-2200 V |
| RATED CURRENT | APPROXIMATELY 4000 A | APPROXIMATELY 8000 A |
| INFERRED SHORT-CIRCUIT CURRENT | APPROXIMATELY 5000 A | APPROXIMATELY 10000 A |

The maximum capacity of ordinary direct current breakers for turning on and off the direct current is DC 1500 V/4000 A (circuit-breakers of the other companies are at similar levels). The DC breaker reduces its breaking capacity as the voltage increases until it reaches the point where it cannot break the current.

To maintain the current capacity, strategy such as using two 4000 A DC breakers connected in a parallel fashion can be taken. However, such current switches that can serve for the 5 MW-10 MW fuel cell power supply have not yet been developed.

SUMMARY OF THE INVENTION

It is therefore an object of the present invention to provide a protective apparatus and method for a fuel cell that can solve the above problems, and can use an ordinary switch to protect the fuel cell.

In a first aspect of the present invention, there is provided a protective apparatus for a fuel cell comprising: switching means connected to the output of the fuel cell; means for detecting the output voltage of the fuel cell; means for setting a reference voltage; means for comparing the detected output voltage of the fuel cell with the reference voltage; and means for opening the switching means when the detected output voltage of the fuel cell drops below the reference voltage.

Here, the switching means may comprise first and second switches connected in a serial fashion, and a semiconductor switch connected in parallel with the first switch.

The protective apparatus for a fuel cell may further comprise a freewheeling diode connected across the output terminals of the fuel cell.

The means for setting may comprise a first setting unit for setting a low reference voltage, the means for comparing may comprise a first comparator for comparing the detected output voltage of the fuel cell with the low reference voltage, and the means for opening may open the first switch when the detected output voltage of the fuel cell drops below the low reference voltage, may open the semiconductor switch when the first switch has been opened, and may open the second switch when the semiconductor switch has been opened.

The means for setting may comprise a second setting unit for setting an over reference voltage, the means for comparing may comprise a second comparator for comparing the detected output voltage of the fuel cell with the over reference voltage, and the means for opening may open the second switch when the detected output voltage of the fuel cell exceeds the over reference voltage, may open the semiconductor switch when the second switch has been opened, and may open the first switch when the semiconductor switch has been opened.

The means for setting may comprise a first setting unit for setting a low reference voltage and a second setting unit for setting an over reference voltage, the means for comparing may comprise a first comparator for comparing the detected output voltage of the fuel cell with the low reference voltage and a second comparator for comparing the detected output voltage of the fuel cell with the over reference voltage, and the means for opening may open the first switch when the detected output voltage of the fuel cell drops below the low reference voltage, may open the semiconductor switch when the first switch has been opened, and may open the second switch when the semiconductor switch has been opened.

In a second aspect of the present invention, there is provided a protective apparatus for a fuel cell comprising: switching means connected to the output of the fuel cell; means for detecting the instantaneous peak current of the output current of the fuel cell; means for storing the occurrence of the instantaneous peak current; and means for opening the switching means in response to the output of the memory means when the instantaneous peak current occurs.

Here, the means for detecting may comprise: a current transformer for detecting the output current of the fuel cell; means for setting a reference current; and a comparator for comparing the detected current of the fuel cell with the reference current.

In a third aspect of the present invention, there is provided a protective method for a fuel cell comprising the steps of: detecting the output voltage of the fuel cell; comparing the detected output voltage of the fuel cell with a predetermined reference voltage; and opening the output of the fuel cell when the detected output voltage of the fuel cell drops below the reference voltage.

In a fourth aspect of the present invention, there is provided a protective method for a fuel cell comprising the steps of: detecting the instantaneous peak current of the output current of the fuel cell; storing the occurrence of the instantaneous peak current; and opening the output of the fuel cell in response to the stored occurrence when the instantaneous peak current occurs.

The present invention detects the output voltage of the fuel cell, and opens the switching means inserted in the output circuit of the fuel cell on the basis of the detected voltage. This makes it possible to use an ordinary switch to arrange a protective apparatus for the fuel cell.

The above and other objects, effects, features and advantages of the present invention will become more apparent from the following description of the embodiments thereof taken in conjunction with the accompanying drawings.

BRIEF DESCRIPTION OF THE DRAWINGS

FIG. 5 is a circuit diagram of a second embodiment of the present invention;

DETAILED DESCRIPTION OF PREFERRED EMBODIMENTS

The invention will now be described with reference to the accompanying drawings.

[A] FIRST EMBODIMENT

Figure 1:
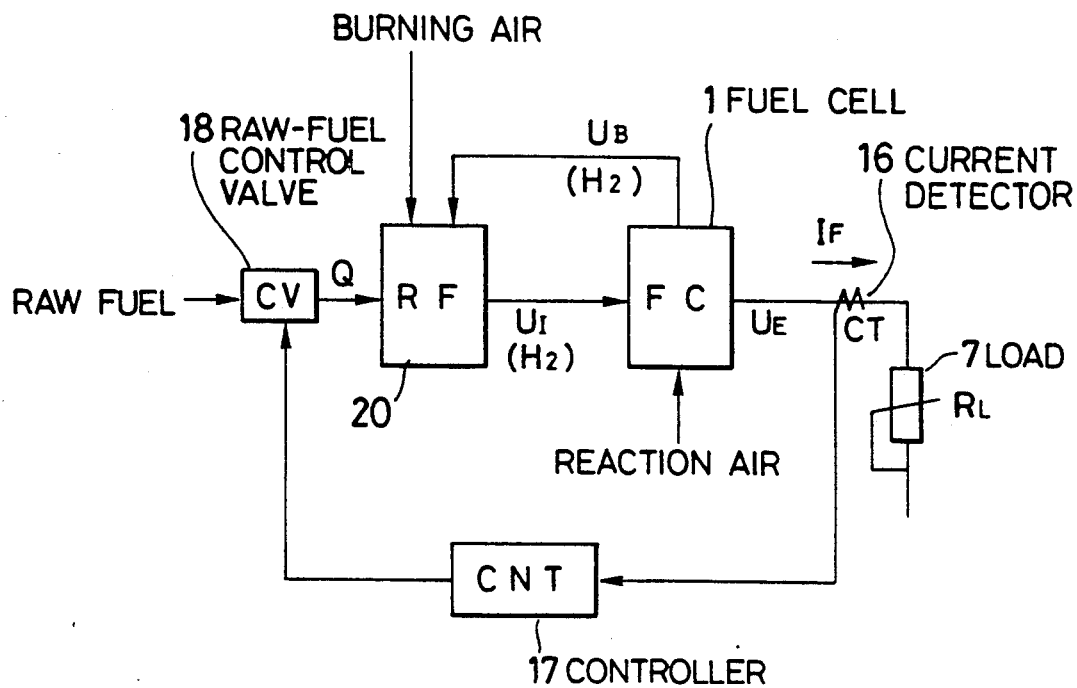
FIG. 1 is a block diagram showing the arrangement of a conventional fuel cell power system.
Figure 2:
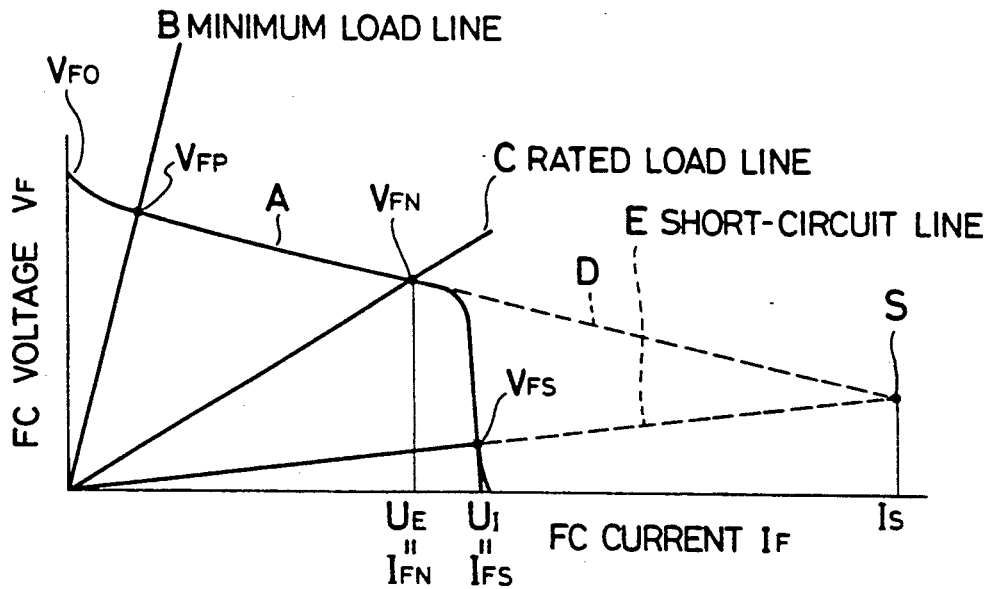
FIG. 2 is a graph illustrating the I-V characteristics of the fuel cell in FIG. 1.
Figure 3:
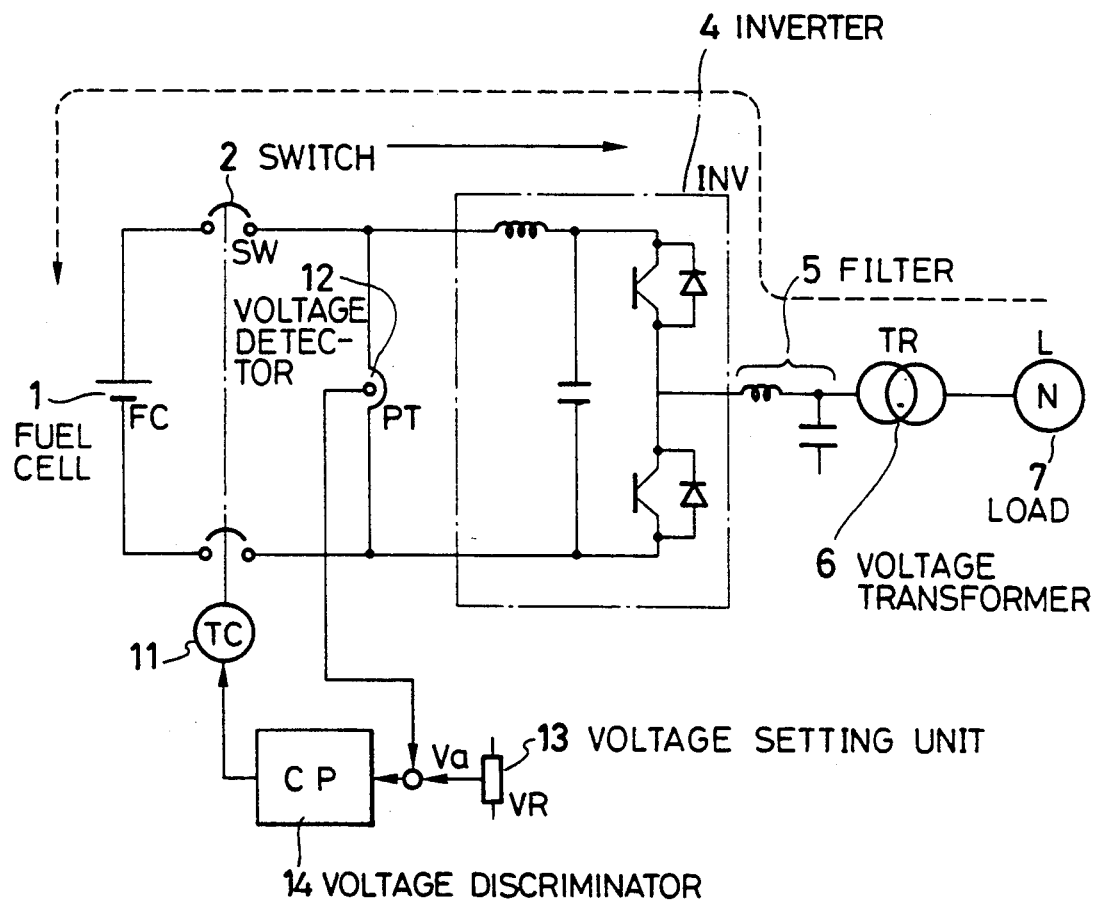
FIG. 3 is a circuit diagram of a first embodiment of the present invention.
Figure 4:
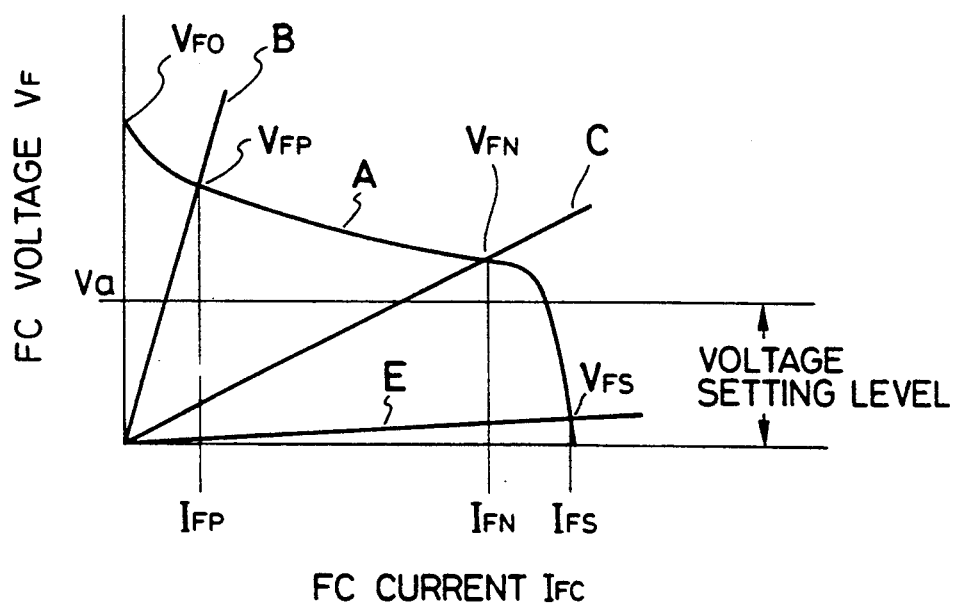
FIG. 4 is a graph illustrating the I-V characteristics of the first embodiment.

FIG. 3 shows an arrangement of a first embodiment of the invention. In FIG. 3, like reference numerals designate like parts in FIG. 1. FIG. 4 illustrates the relationship between the I-V characteristic curve A and the voltage setting level Va in the first embodiment. In FIG. 4, like reference numerals designate like parts in FIG. 2.

If a failure such as an overload or a shortcircuit occurs in the fuel cell power system, the output voltage of the fuel cell 1 suddenly drops to $V_{FS}$. A voltage detector 12 in the form of a voltage transformer (PT) detects the output voltage of the fuel cell 1. A voltage setting unit 13 in the form of a variable resistor (VR) sets a reference voltage Va (shown in FIG. 4, also). A voltage discriminator 14 in the form of a comparator (CP) determines whether the output voltage of the fuel cell 1 detected by the voltage detector 12 drops below the reference voltage Va. The output of the voltage discriminator 14 actuates a trip coil (TC) 11 of a switch (SW) 2, thus opening the switch 2.

[B] SECOND EMBODIMENT

FIG. 5 is a block diagram of a second embodiment. In FIG. 5, like reference numerals designate like parts in FIG. 1. A switching circuit comprises switch SW1, semiconductor switch Q1, and switch SW2.

Figure 6:
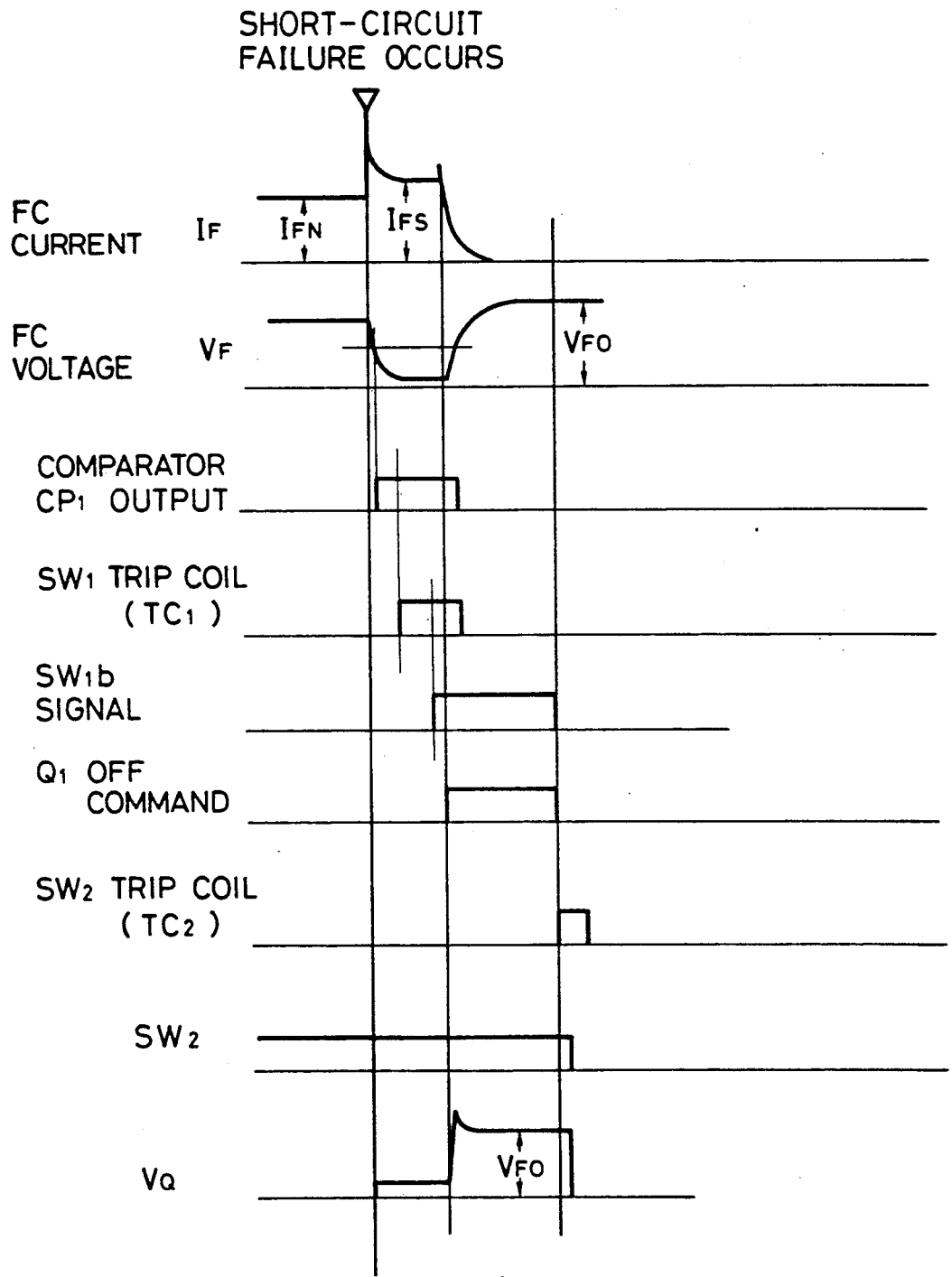
FIG. 6 is a time chart illustrating the operation of the second embodiment at a short-circuit failure.

FIG. 6 is a timing chart showing the operation of the fuel cell power supply in FIG. 5 at a short-circuit failure. The short-circuit failure increases the fuel cell current $I_F$ as shown in FIG. 6. The increased current is about 1.33-1.25 times the steady state current $I_{FN}$.

In this case, the voltage $V_F$ of the fuel cell 1 suddenly drops. The voltage detector 12 detects the voltage $V_F$. A voltage discriminator 14A in the form of a comparator (CP1) operates when the detected voltage is lower than the reference voltage set by a low voltage setting unit (VR1) 31, and feeds a signal 101 to the controller (CNT) 17.

The controller 17 supplies a signal to a trip coil (TC1) 11A thereby to open the switch SW1. When the switch SW1 opens, a break contact SW1b turns on, and the controller 17 supplies the semiconductor switch Q1 with an off-command signal 103. Thus, the semiconductor switch Q1 turns off, and cuts off the current caused by the short-circuit failure. The semiconductor switch Q1 is protected from breaking because it includes a snubber circuit which absorbs the counter electromotive force generated when the switch Q1 turns off.

After that, the controller 17 supplies the trip coil (TC2) 11B with a signal 104 to open switch SW2. The switch SW2 opens, which completes the operation.

At the short-circuit failure, the current flows the loop of the fuel cell 1, the switch SW1, the switch SW2, the short-circuit point G, the switch SW2, and the fuel cell 1. When the switch SW1 is opened, the short-circuit current transfers from the switch SW1 to the semiconductor switch Q1. The voltage drop $V_Q$ across the switch Q1 is so small (less than a few volts) that it is sufficient for the switch SW1 to open a circuit to which a few volts/several thousand amperes are applied. As a result, a switch of low breaking capacity (for example, a breaker) can be used as the switch SW1.

Furthermore, it is sufficient for the switch SW2 to have a capacity similar to that of the switch SW1 because the switch SW2 opens only after the semiconductor switch Q1 breaks the short-circuit current. In short, an ordinary switching unit can be used instead of a high-voltage large-current capacity breaker for the direct current.

In the normal operation, the switch SW1 shorts the semiconductor switch Q1, which reduces the power loss to an extremely small value. Although the operation explained above is about a short-circuit failure, a similar operation is performed in an overload.

Figure 7:
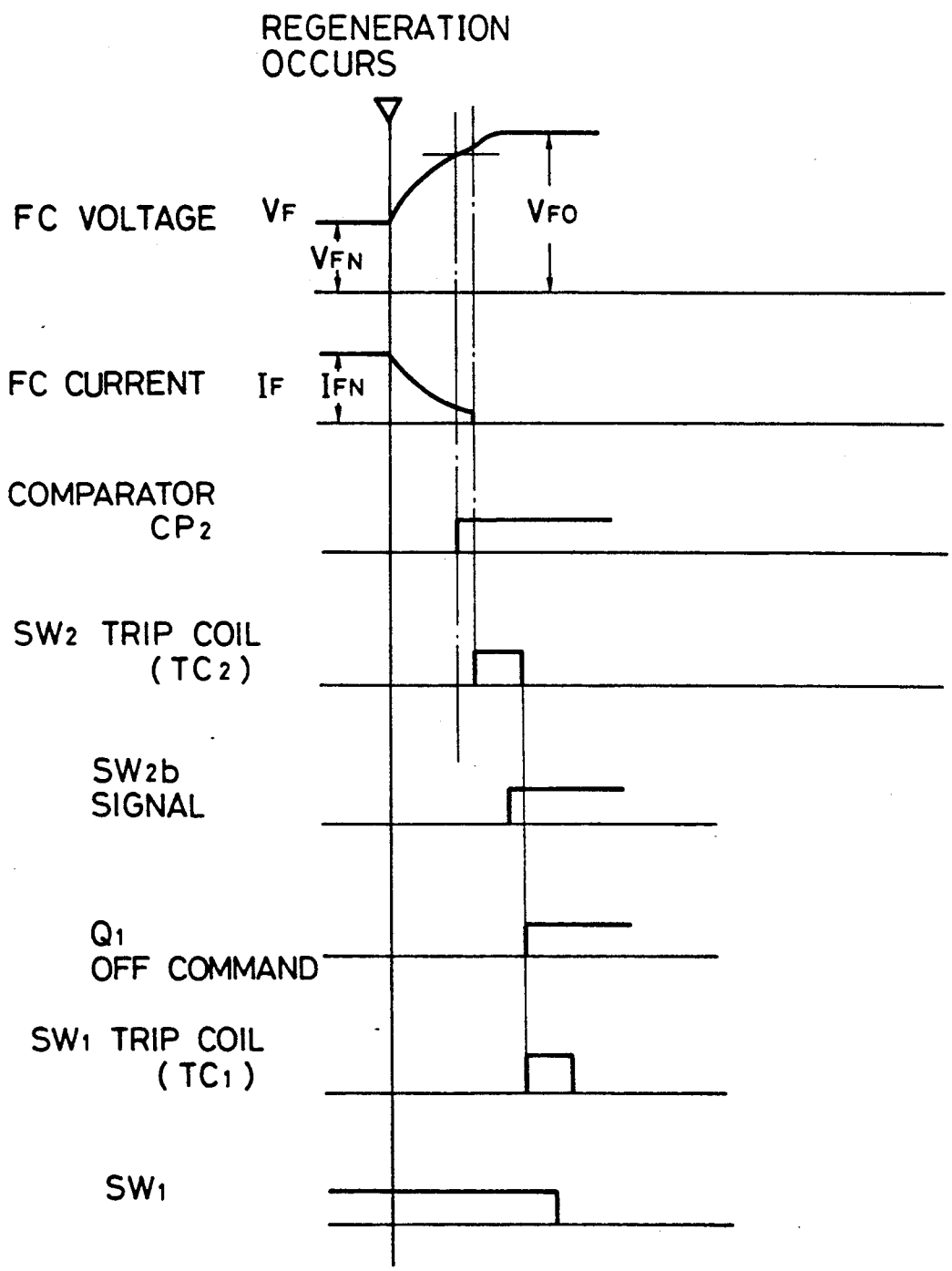
FIG. 7 is a time chart illustrating the operation of the second embodiment at a regeneration.

FIG. 7 is a timing chart of the operation when the power regeneration from the system power supply 27 to the fuel cell 1 occurs by some cause in the fuel cell power supply of FIG. 5.

As described before, the short-circuit or overload failure induces deterioration of the fuel cell 1 because of gas shortage. In contrast with this, the power regeneration induces electrolysis in the fuel cell 1 due to the reverse current. This may introduce the danger of explosion due to the reaction between the hydrogen and oxygen produced by the electrolysis.

When the power regeneration from the system power supply 27 to the fuel cell 1 occurs, the increase of the fuel cell voltage $V_F$ and the decrease of the fuel cell current $I_F$ occurs simultaneously. When the fuel cell voltage $V_F$ exceeds the reference voltage set by an overvoltage setting unit (VR2) 32, a voltage discriminator 14B in the form of a comparator (CP2) is actuated to supply the controller 17 with a signal 102.

The controller 17, receiving the signal 102, supplies the trip coil (TC2) 11B with a signal 104 to open the switch SW2. When the switch SW2 opens, the break contact SW2b of the switch SW2 turns on. This makes the controller 17 issue the off command to the semiconductor switch Q1. At the same time, the controller 17 sends a command to the trip coil (TC1) 11A of the switch SW1 to release the switch SW1 to open the circuit, thus completing the operation.

It is sufficient for the switch SW2 to have a low breaking capacity as in the above-mentioned short-circuit failure. This is because the switch SW2 opens the circuit of a low voltage and a low fuel cell current, the voltage being the difference between the fuel cell voltage $V_F$ and the input voltage of the inverter 4.

Furthermore, the switch SW1 and the semiconductor switch Q1 open the circuit with no current.

As described above, in the short-circuit mode, a switch SW1 capable of opening a low voltage and large current is sufficient; and a switch SW2 of substantially no breaking capacity is sufficient because the switch SW2 opens after the semiconductor switch Q1 breaks the short-circuit current and so the switch SW2 opens the circuit with no current.

In the regeneration mode, the switch SW2 capable of opening a low voltage (the difference voltage) small current is sufficient. The switch SW1 and the semiconductor switch Q1 open the circuit with no current. A freewheeling diode (FWD) 26 is provided for preventing the surge voltage generated at the circuit breaking from being applied to the fuel cell 1.

As described above, since the switches SW1 and SW2 require a low voltage large current breaking capacity or a low voltage (difference voltage) small current breaking capacity, common switches can be used as the switches SW1 and SW2. In addition, the reduction of the breaking voltage and current of the switches SW1 and SW2 make an arc extinguish chamber unnecessary. This makes it possible to reduce the size of the fuel cell power supply.

Moreover, since the semiconductor switch Q1 is normally short-circuited by the switch SW1, the loss of the semiconductor switch Q1 is zero. This obviates the cooling device for the semiconductor switch Q1, which enables a reduction in the size of the fuel cell power supply.

[C] THIRD EMBODIMENT

Figure 8:
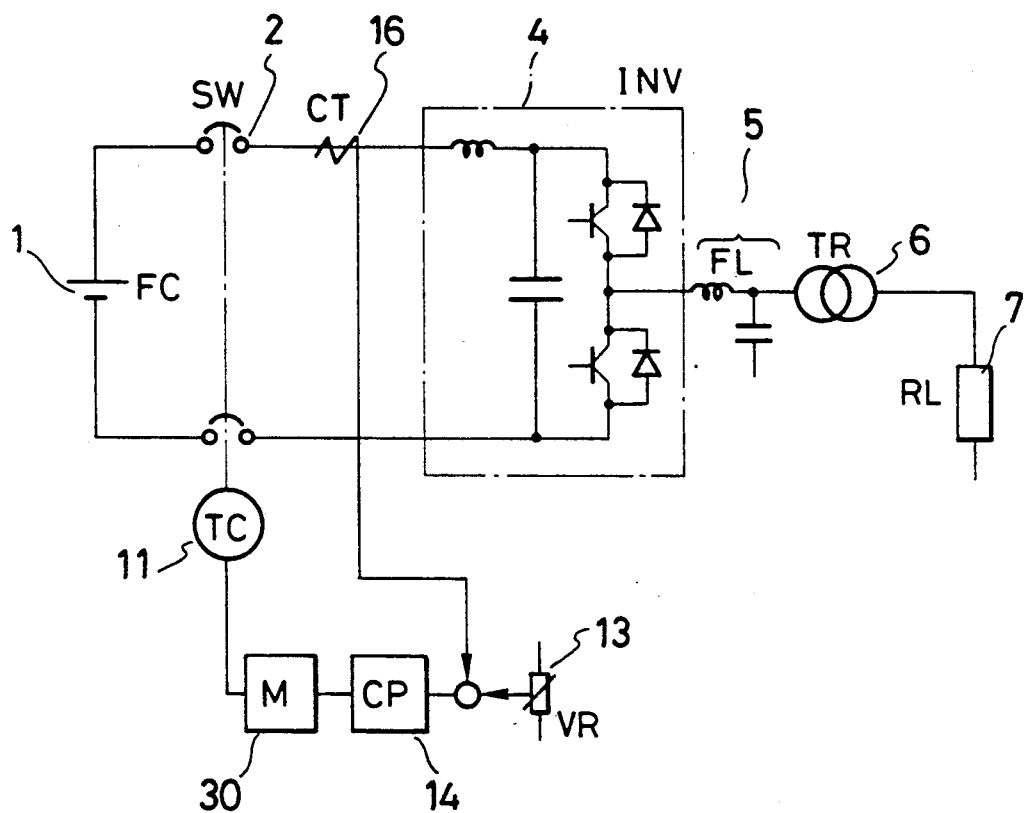
FIG. 8 is a circuit diagram of a third embodiment of the present invention.

FIG. 8 shows a third embodiment of the present invention. In FIG. 8, like reference numerals in FIGS. 3 and 5 designate like parts. A short-circuit failure at the output side of the fuel cell 1 or an overload at the output side of the transformer (TR) 6 in FIG. 8 makes an instantaneous current with a peak $I_{FSP}$ shown in FIG. 11 flow out of the fuel cell 1.

Accordingly, the present embodiment, considering the fact that the instantaneous peak current $I_{FSP}$ always takes place in the short-circuit failure or the overcurrent made detects the instantaneous peak current $I_{FSP}$ and opens the switch SW2 to ensure protection of the fuel cell 1.

Figure 9:
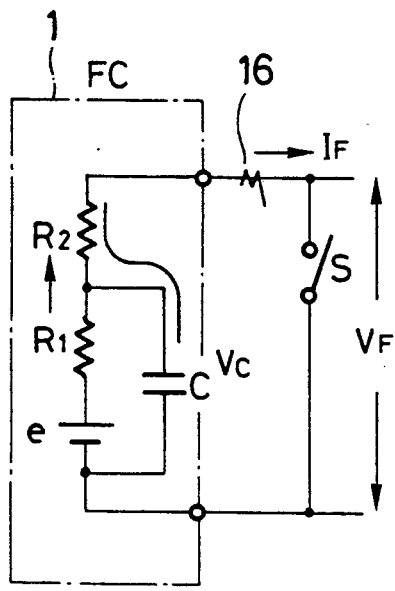
FIG. 9 is a circuit diagram showing an equivalent circuit of the fuel cell shown in FIG. 8.

The behavior of a fuel cell with a short-circuit differs from that of common cells in the following way:

(1) At the initial stage of the short-circuit, the instantaneous peak current of 5–10 times the rated current flows owing to the capacitor C in FIG. 9.

(2) The peak current terminates in a very short time: it is only an instantaneous phenomenon.

(3) When the short-circuit continues, the output current of the fuel cell settles at the current of 1.33–1.25 times the rated current which is expressed by $V_{FN}/I_{FN}$ in FIG. 4.

The instantaneous peak current can actuate a mechanical switch or an electronic switch if the response of these switches is sufficiently quick. Switches of large capacity, however, have a rather slow response, and so cannot respond to the instantaneous peak current. Thus, the occurrence of the peak current must be stored by a memory as explained below.

Figure 10:
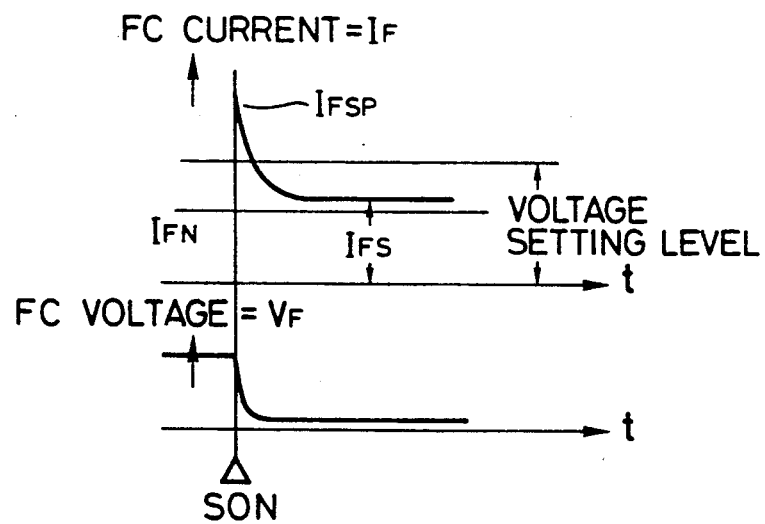
FIG. 10 is a graph illustrating the temporal change in the output current of the equivalent circuit shown in FIG. 9.

FIG. 9 shows an equivalent circuit of the fuel cell 1. FIG. 10 is the timing chart of the operation of the circuit shown in FIG. 9. In FIG. 9, reference character e designates a theoretical value of the generated voltage of the fuel cell 1, reference characters $R_1$ and $R_2$ designate internal resistance of the fuel cell 1, and character C denotes a capacitor in the fuel cell 1, the electrostatic capacity (equivalent electrostatic capacity) of which is C. Thus, the voltage across the capacitor C exists when the fuel cell power supply is in operation, and the voltage is represented by $V_C$.

In FIG. 9, it is experimentally ascertained that the instantaneous peak current $I_{FSP}$ flows as shown in FIG. 10 when the switch S is closed. This current is considered as a discharge current of the equivalent electrostatic capacitor C in the fuel cell 1 at the instant when the switch S is closed.

When a short-circuit failure at the output side of the fuel cell 1 or an overload at the output side of the transformer 6 occurs in FIG. 8, the following peak current $I_{FSP}$ will flow. Here, the resistance between the output terminals of the fuel cell 1 and the short-circuit point is neglected.

$$I_{FSP} = V_C/R_2 \sim I_{FC}$$
$$= V_C/(R_2 + R_S + R_{FL} + R_{TL} + R_X)$$

where
$R_S = R_2 + R_{INV}$
$R_2$: the internal resistance of the fuel cell 1
$R_{INV}$: the resistance in the inverter 4
$R_{FL}$: the resistance of the filter 5
$R_{TL}$: the resistance of the transformer 6
$R_X$: the resistance of the wire The fuel cell current $I_F$ decays exponentially, which can be approximated by the following expression.

$$I_F = I_{FSP} \times \exp(-t/T)$$

where $T = C \times R_2$ or $C \times (R_2 + R_S)$

Thus, the electric charge stored in the electrostatic capacity C is discharged to the final value of $I_{FS}$ after a certain period.

$$I_{FS} = I_{FN} \times (1.33 \sim 1.25)$$

Figure 11:
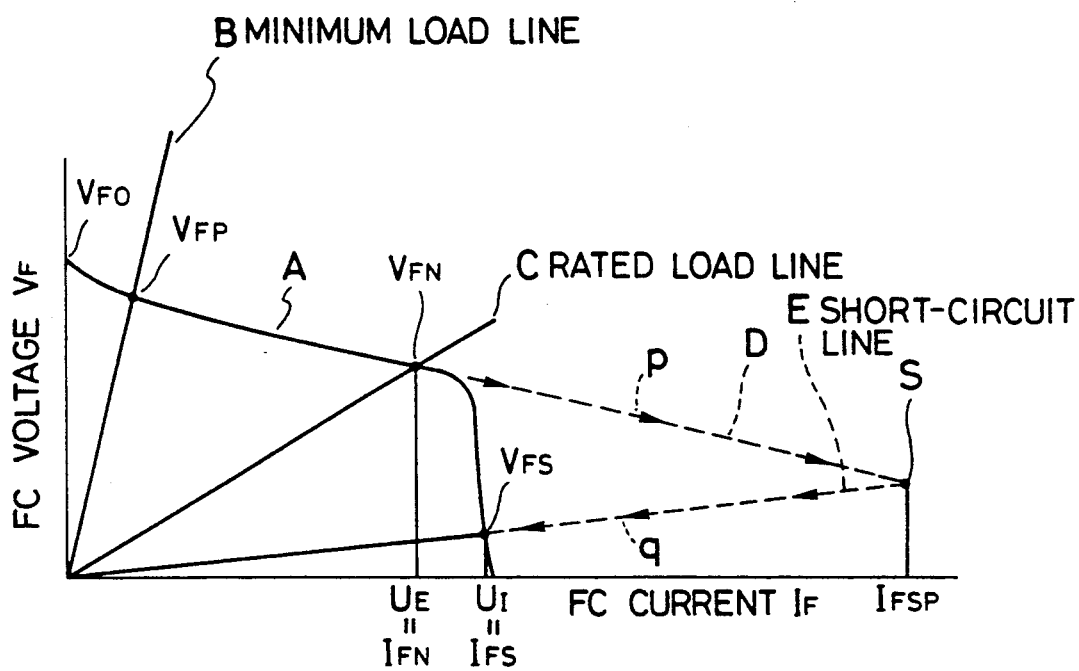
FIG. 11 is a graph illustrating the I-V characteristics of the third embodiment.

The above phenomenon will be described with reference to FIG. 11. When a short-circuit failure occurs at the output side of the fuel cell 1 during the operation of the fuel cell 1 with the voltage of $V_{FN}$ and the current of $I_{FN}$, the output current $I_F$ increases in the direction of the arrow p to the point S (here, the maximum current $I_{FSP}$ flows) in FIG. 11, thus discharging the capacitor C. After that, the fuel cell current $I_F$ decreases from the point S to the final values $V_{FS}$ and $I_{FS}$ in the direction of the arrow q.

Thus, the short-circuit current (instantaneous peak current) is detected by the voltage discriminator 14. The occurrence of the peak current is stored by a memory (a flip-flop) 30, and the output of the memory 30 actuates the trip coil 11 to open the switch SW2. This protects the fuel cell 1 from the short-circuit failure. The occurrence of the peak current must be stored by the memory to ensure sufficient time to actuate the large capacity switch.

As described above, the present invention can quickly protect the fuel cell from a failure such as an overload, a short-circuit or a regeneration with a simple circuit configuration.

Although specific embodiments of a protective apparatus and method for a fuel cell constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An apparatus for protecting a fuel cell having an output for producing an output voltage against damage due to operation outside of an output voltage range, comprising:

switching means connected to the output of the fuel cell;

means coupled to the output of the fuel cell for detecting the output voltage of the fuel cell;

means for setting a reference voltage;

means coupled to said output voltage detecting means and said setting means for comparing the detected output voltage of the fuel cell with the reference voltage; and means responsive to said comparing means and connected to said switching means for opening the switching means when the detected output voltage of the fuel cell drops below the reference voltage.

2. An apparatus for protecting a fuel cell as claimed in claim 1, wherein said switching means comprises first and second switches connected in a serial fashion, and a semiconductor switch connected in parallel with said first switch.

3. An apparatus for protecting a fuel cell as claimed in claim 2, wherein said fuel cell has output terminals, said apparatus further comprising a freewheeling diode connected across the output terminals of the fuel cell.

4. An apparatus for protecting a fuel cell as claimed in claim 2, wherein said means for setting comprises a first setting unit for setting a low reference voltage, said means for comparing comprises a first comparator for comparing the detected output voltage of the fuel cell with the low reference voltage, and said means for opening opens the first switch when the detected output voltage of the fuel cell drops below the low reference voltage, opens the semiconductor switch when the first switch has been opened, and opens the second switch when the semiconductor switch has been opened.

5. An apparatus for protecting a fuel cell as claimed in claim 2, wherein said means for setting comprises a second setting unit for setting an over reference voltage, said means for comparing comprises a second comparator for comparing the detected output voltage of the fuel cell with the over reference voltage, and said means for opening opens the second switch when the detected output voltage of the fuel cell exceeds the over reference voltage, opens the semiconductor switch when the second switch has been opened, and opens the first switch when the semiconductor switch has been opened.

6. An apparatus for protecting a fuel cell as claimed in claim 2, wherein said means for setting comprises a first setting unit for setting a low reference voltage and a second setting unit for setting an over reference voltage, said means for comparing comprises a first comparator for comparing the detected output voltage of the fuel cell with the low reference voltage and a second comparator for comparing the detected output voltage of the fuel cell with the over reference voltage, and said means for opening opens the first switch when the detected output voltage of the fuel cell drops below the low reference voltage, opens the semiconductor switch when the first switch has been opened, and opens the second switch when the semiconductor switch has been opened.

7. An apparatus for protecting a fuel cell having an output for producing an output current against damage due to an overcurrent condition, comprising:
switching means connected to the output of the fuel cell;
means coupled to the output of the fuel cell for detecting an occurrence of an instantaneous peak current of the output current of the fuel cell;
means coupled to said detecting means for producing an output in response to a detection of an instantaneous peak current; and
means coupled between said producing means and said switching means for opening said switching means in response to the output of said producing means when the instantaneous peak current occurs.

8. An apparatus for protecting a fuel cell as claimed in claim 7, wherein said means for detecting comprises:
a current transformer for detecting the output current of the fuel cell;
means for setting a reference current; and
a comparator for comparing the detected current of the fuel cell with the reference current.

9. A method for protecting a fuel cell connected to a load against damage due to operation outside of an operating voltage range, comprising the steps of:
detecting an output voltage of the fuel cell;
comparing the detected output voltage of the fuel cell with a reference voltage; and
disconnecting the output of the fuel cell from the load when the detected output voltage of the fuel cell drops below the reference voltage.

10. A method for protecting a fuel cell connected to a load against damage due to an overcurrent condition, comprising the steps of:
detecting an occurrence of instantaneous peak current of the output current of the fuel cell; and
disconnecting the output of the fuel cell from the load in response to said detecting step.

11. An apparatus for protecting a fuel cell having an operating range of output voltage for supplying a load from damage when the fuel cell operates outside of the operating range comprising:
means for setting a threshold voltage;
means for detecting the output voltage of the fuel cell;
means connected to said setting means and said detecting means for comparing the detected output voltage to the threshold voltage to produce a comparison output when the detected output voltage passes through the threshold voltage;
switching means connected between the fuel cell and the load for disconnecting said output voltage from the load in response to the comparison output.

12. An apparatus as recited in claim 11, wherein said fuel cell has an output terminal and said switching means comprises first and second switches serially interposed between the output terminal of said fuel cell and the load and a semiconductor switch electrically connected in parallel with said first switch.

13. An apparatus as recited in claim 12, wherein said fuel cell has output terminals, and said apparatus further comprises a freewheeling diode connected across said output terminals.

14. An apparatus as recited in claim 12, wherein said setting means comprises a setting unit for setting a minimum threshold voltage, and said switching means includes opening means for opening said first switch when the detected output voltage drops below the minimum threshold voltage, opening the semiconductor switch after the first switch has been opened and opening the second switch after the semiconductor switch has been opened.

15. An apparatus as recited in claim 12, wherein said setting means comprises a setting unit for setting a maximum threshold voltage, and said switching means includes opening means for opening the second switch when the detected output voltage exceeds the maximum threshold voltage, opening said semiconductor switch after said second switch has been opened and, opening said first switch after said semiconductor switch has been opened.

16. An apparatus as recited in claim 12, wherein said setting means comprises a first setting unit for setting a minimum threshold voltage and a second setting unit for setting a maximum threshold voltage, said comparing means comprises a first comparator for comparing the detected output voltage with the minimum threshold voltage and a second comparator for comparing the detected output voltage with the maximum threshold voltage, and said switching means includes opening means for opening said first switch when the detected output voltage drops below the minimum threshold voltage, opening said semiconductor switch after said first switch has been opened and opening the second switch after the semiconductor switch has been opened.

* * * * *